United States Patent [19]
Joslin et al.

[11] 4,092,515
[45] May 30, 1978

[54] LASER METHOD OF PRECISION HOLE DRILLING

[75] Inventors: Frederick R. Joslin, Lebanon; Gary E. Palma, Rocky Hill; Gary L. Whitney, Windsor, all of Conn.

[73] Assignee: United Technologies Corporation, Hartford, Conn.

[21] Appl. No.: 785,726

[22] Filed: Apr. 7, 1977

[51] Int. Cl.$^2$ .............................................. B23K 9/00
[52] U.S. Cl. ............................................. 219/121 LM
[58] Field of Search ..... 219/121 L, 121 LM, 121 EB, 219/121 EM

[56] References Cited

U.S. PATENT DOCUMENTS

| | | | |
|---|---|---|---|
| 3,588,440 | 6/1971 | Morse | 219/121 LM |
| 3,942,093 | 12/1975 | Feldman et al. | 219/121 LM |
| 4,000,392 | 12/1976 | Banas et al. | 219/121 LM |

*Primary Examiner*—J. V. Truhe
*Assistant Examiner*—Fred E. Bell
*Attorney, Agent, or Firm*—Lawrence A. Cavanaugh

[57] ABSTRACT

A method for obtaining a hole in a workpiece essentially free of a recast layer and heat affected zone with laser radiation is disclosed. Pulses of laser radiation having durations comparable to the time required to vaporize workpiece material, typically less than ten nanoseconds, and power densities at the workpiece sufficient to produce vaporization, typically in excess of a billion watts per square centimeter, are interacted with a workpiece in an oxidizing environment to produce vaporization of workpiece material. The vapor reacts with the gas to produce a vapor oxide which does not adhere to the workpiece resulting in the absence of a recast layer. A hole having a desired size and shape is obtained by interacting the pulses of radiation with the workpiece at a high rate of repetition, typically in excess of ten pulses per second, until a desired amount of material is removed. The pulse duration is less than the thermal reaction time of the material resulting in the absence of a heat affected zone.

16 Claims, 9 Drawing Figures

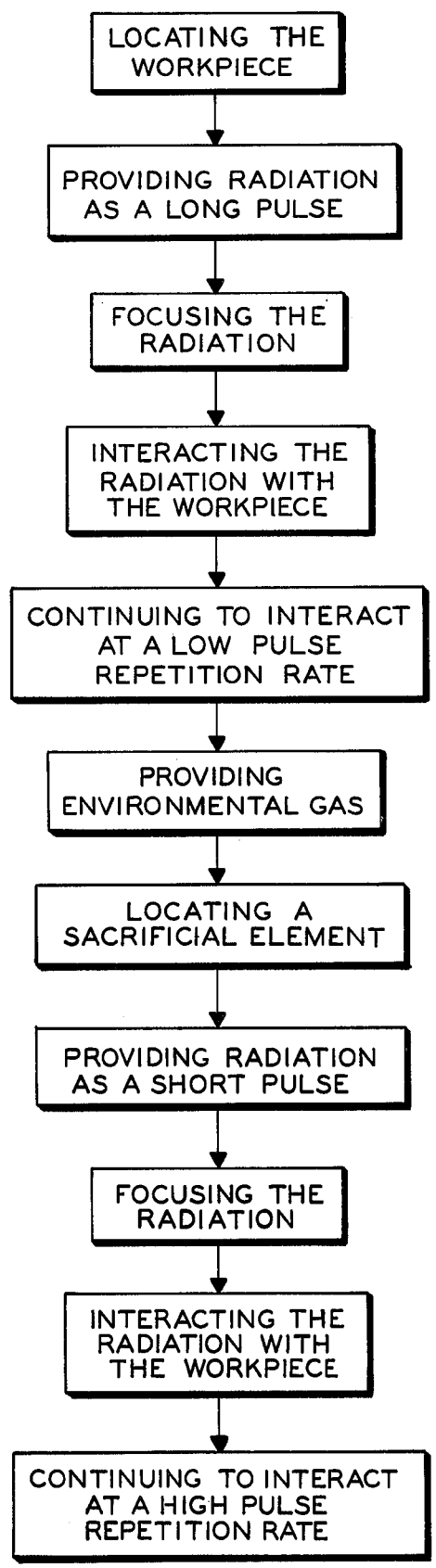

LASER METHOD OF PRECISION HOLE DRILLING

BACKGROUND OF THE INVENTION

1. Field of the Invention

This invention relates to hole drilling and more particularly to a method of using laser radiation to form holes free of recast layers and heat affected zones.

2. Description of the Prior Art

The use of laser radiation as long pulses having durations varying from microseconds to milliseconds, pulse energies of at least one joule and repetition rates less than ten pulses per second is well known to be capable of efficiently removing material from a workpiece to produce a hole. The energy of the pulse incident on the workpiece is partially utilized to produce vaporization of surface material in a time interval short compared to the pulse duration, while the remaining energy of the pulse is absorbed to produce melting of subsurface material. The surface vaporization results in a cooling mechanism which reduces the surface temperature and causes the maximum temperature area to lie below the surface. The subsurface melting generates a high subsurface pressure which produces an explosive expulsion of the molten material from the workpiece. As the melted material is expelled from the workpiece, portions of the melt solidifies along the walls of the hole producing a recast layer. The material structure of the recast layer is dissimilar to the base material, is usually of low ductility and is prone to shrinkage cracks which are capable of propagating into the base material. Also, the subsurface melting results in significant heat conduction into the base material of the workpiece resulting in the formation of a heat affected zone within the wall of the hole.

Deep holes are usually obtained by repetitively interacting the pulses of laser radiation with the workpiece. The hole obtained is typically noncircular, has a recast layer having variations in its thickness resulting in variations in the diameter of the hole along its length and generally has significant taper from end to end which is undesirable for most applications.

The explosive expulsion of melted material results in molten splatter being ejected from the workpiece in a direction along the path of the laser radiation. Unless protection is provided, the splatter usually deposits on the focusing optics causing distortion of the pulse shape and absorption of the pulse energy, which reduces the efficiency of the material removal process. The optics are typically protected by inserting a transparent protective shield between the optics and the workpiece to collect the splatter or by the utilization of a stream of gas across the path of the laser radiation to deflect the splatter and inhibit impingement on the optics.

The use of laser radiation as pulses having durations of at least twenty nanoseconds, energies less than one hundred millijoules and repetition rates less than ten pulses per second are also known to remove material from a workpiece. The material removal process is comparable to that of the long pulses and holes are obtained having recast layers and heat affected zones.

SUMMARY OF THE INVENTION

A primary object of the present invention is to form holes in a workpiece with laser radiation.

According to a preferred embodiment of the present invention a method for obtaining a hole essentially free of recast layer and heat affected zone with a sequence of pulses of laser radiation includes the steps of: locating a workpiece in an environmental gas capable of oxidizing vaporized workpiece material, providing laser radiation as pulses having durations comparable to the time required to vaporize workpiece material, typically 10 nanoseconds or less, focusing the pulses to obtain power densities at the workpiece capable of vaporizing workpiece material, interacting the focused pulses with the workpiece to remove material by vaporization, and continuing to interact the focused pulses with the workpiece at high pulse repetition rates, typically ten pulses per second or greater, until a desired amount of material is removed to form the hole. In one embodiment of the present invention a method of forming a hole essentially free of recast layer and heat affected zone with a sequence of pulses of laser radiation includes the steps of providing laser radiation as pulses having durations long compared to the time required to vaporize workpiece material, focusing the pulses to obtain power densities capable of removing subsurface material, interacting the focused pulses with the workpiece until a desired amount of material is removed to form a hole typically having undesirable qualities such as a recast layer and heat affected zone, followed by the steps of the preferred embodiment to remove the undesirable qualities.

A primary feature of the present invention is the utilization of laser radiation as pulses having a duration typically ten nanoseconds or less. Pulses, preferably having energies of a tenth of a joule or more, are focused to a spot having a diameter typically variable between 0.04 to 0.01 centimeters resulting in a pulse having a focused power density between $8 \times 10^9$ to $10 \times 10^{10}$ watts per square centimeter. The pulses of focused radiation are interacted with the workpiece at a high pulse repetition rate, preferably of at least 50 pulses per second, to remove material by vaporization. The vaporized material ejected from the workpiece interacts with the oxidizing environment to form a vapor oxide which does not condense on the workpiece. Essentially, all of the energy of the pulse is utilized to vaporized material in a time short compared to the thermal reaction time of the workpiece material resulting in little or no heat conduction into the base material.

A primary advantage of the present invention is the formation of holes having walls that are free of recast layers thereby eliminating the heretofore problem of microcrack propagation from the recast layer into the base material. Also, minimum heat conduction into the base material results in improved mechanical strength of the workpiece. Additionally, the use of repetitive pulses allows the geometry of the hole to be shaped and reduces the magnitude of the taper between the entrance and exit of the hole. An advantage of a particular embodiment of the present invention is the efficient formation of holes having recast layers and heat affected zones by conventional techniques combined with the preferred embodiment of the present invention to remove the recast layers and heat affected zones. Additionally, the vapor oxide, produced by the interaction of the ejected vaporized material with the oxidation environment, does not condense on the surface of the focusing optics. This results in a significant reduction in the replacement rate of the focusing optics.

The foregoing and other objects, features and advantages of the present invention will become more apparent in the light of the following detailed description of

BRIEF DESCRIPTION OF THE DRAWING

FIG. 6 shows a diagram of the steps of forming holes according to an embodiment of the present invention.

DESCRIPTION OF THE PREFERRED EMBODIMENT

The amount of material removed by interacting a pulse of energy with a workpiece and the depth to which heat generated by the interaction penetrates into the workpiece can be approximated by the equation:

$$S = \frac{\int P \, dt}{\rho L_v + \rho C_p T_v} - \frac{1}{4} \frac{\delta}{(L_v/C_p T_v + 1)} \quad (1)$$

when $t$ is the pulse duration S is the depth of varporization, $P$ is the absorbed power of the pulse, $\rho$ is the density of the workpiece material, $C_p$ is the specific heat of the workpiece material, $T_v$ is the vaporization temperature, $L_v$ is the latent heat of fusion, and $\delta$ is the heat penetration depth.

The results of applying this equation to calculate vaporization and heat penetration depths in a workpiece of Mar-M200 + HF material are shown in Table I for various shaped energy pulses. This calculation assumed the material values of $\rho = 8.64$ grams per cubic centimeter, $C_p = $ to 0.098 calories, $T_v = 2,774°$ C, $L_v = 960$ calories per gram, $K = 0.033 \times 10^{-9}$ calorie per nanosecond-centimeter-degrees C. The thermal conductivity and specific heat values are assumed to be constant for the calculations.

TABLE I

| Pulse | t (ns) | $t_r$ (ns) | $t_f$ (ns) | E (millijoules) | p (w/cm²) | δ (microns) | S (microns) |
|---|---|---|---|---|---|---|---|
| A | 20 | 4 | 16 | .5 | 8 × 10⁸ | .98 | .86 |
| B | 20 | 4 | 4 | .8 | 8 × 10⁸ | .52 | 2.48 |
| C | 20 | 0 | 0 | 1 | 8 × 10⁸ | .06 | 3.56 |
| D | 40 | 0 | 0 | 1 | 4 × 10⁸ | .13 | 3.56 |

Figure 1A:
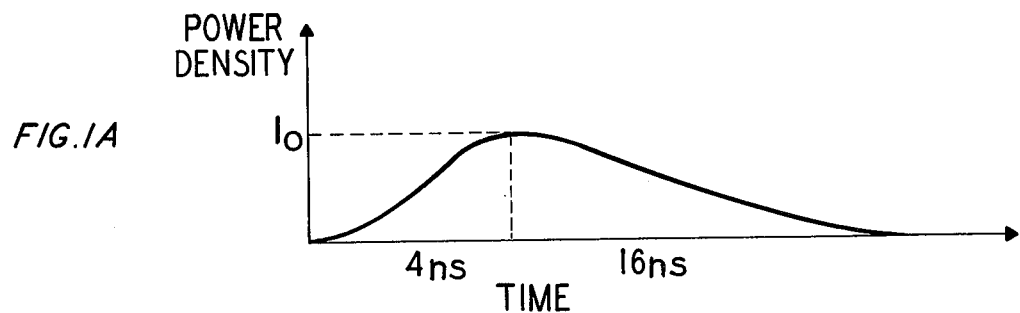
FIGS. 1A, B, C, D show the pulse characteristics utilized to calculate material removal depths and heat affected depths for Mar-M200 + HF material.
Figure 1B:
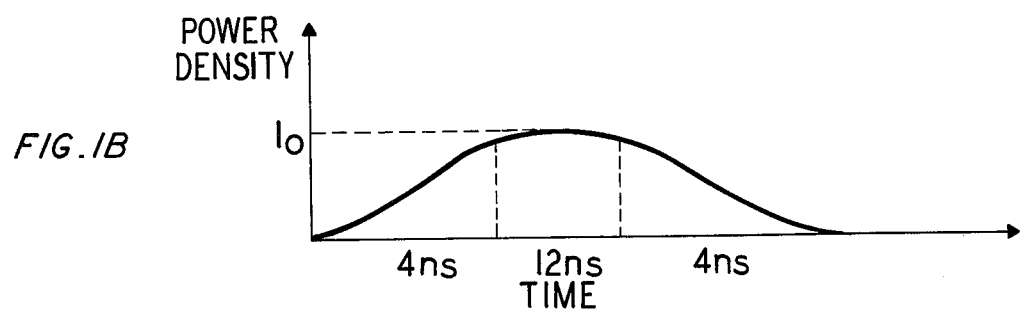
Figure 1C:
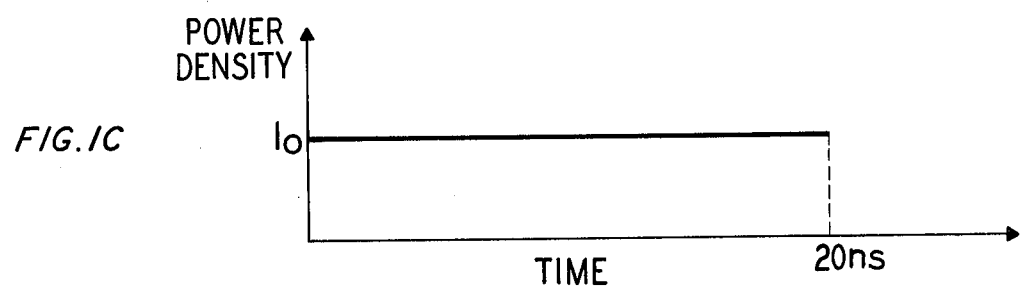
Figure 1D:
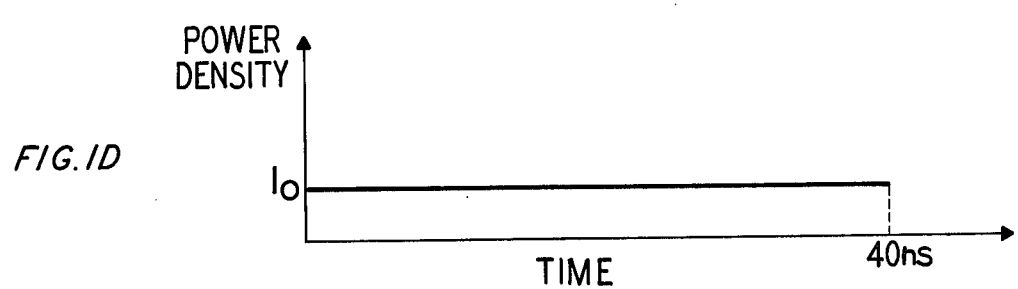

In Table I, $t_r$ is the rise time of the pulse in nanoseconds, $t_f$ is the fall time of the pulse in nanoseconds, and E is the energy of the pulse absorbed in the workpiece. FIG. 1A shows the pulse shape of Pulse A in Table I. The pulse has a duration of 20 nanoseconds (ns) with a rise time of 4 nanoseconds and a fall time of 16 nanoseconds. FIG. 1B, 1C and 1D show the shape of pulses B, C and D respectively as noted in Table I.

Examination of Equation (1) shows that the material removal process is maximized by minimizing the heat conduction into the workpiece. The results in Table I for Mar-M200 + HF material show that minimum heat conduction can be achieved by using pulses of laser radiation having high intensity, short duration and rapid rise and fall times as shown in FIG. 1C. The short pulses vaporize the material in a time short compared to the thermal reaction time of the material resulting in little or no heat conduction into the workpiece. This results in essentially all of the pulse energy being utilized to remove material by vaporization. Examination of Table I also shows that as the pulse length is increased as shown in FIG. 1D, the heat conduction depth increases resulting in an increase in the heat affected zone in the workpiece material around the area from which material has been removed.

Figure 2:
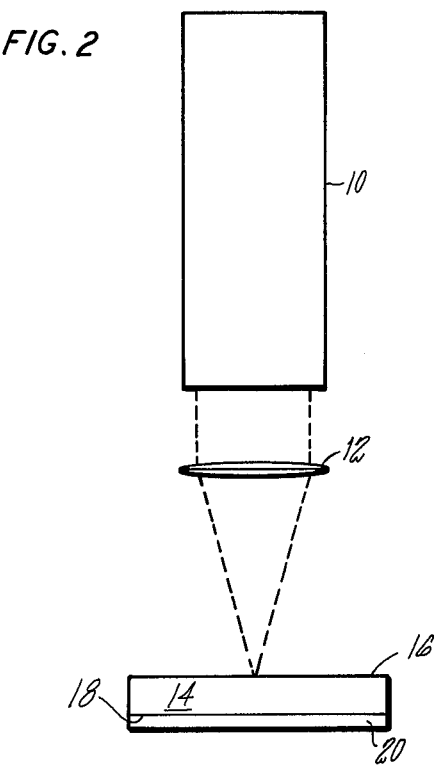
FIG. 2 shows a schematic diagram of a system for producing holes in a workpiece.

FIG. 2 shows a typical arrangement of a system for producing holes in materials. Pulses of radiation from a laser 10 are focused by focusing optics 12 onto a workpiece 14 having a front surface 16 and a back surface 18. A sacrificial element 20 is positioned against the back surface.

Figure 3:
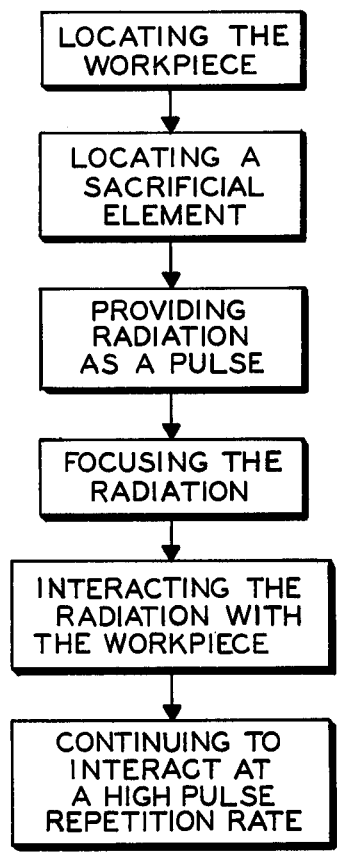
FIG. 3 shows a diagram of the steps of forming holes according to the present invention.

According to the present invention holes are obtained in materials free of recast layers and heat affected zones by the steps as outlined in FIG. 3. The steps include locating a workpiece in an environmental gas capable of oxidizing vaporized workpiece material, locating a sacrificial element in contact with the back surface of the workpiece, providing laser radiation in the TEM$_{00}$ mode as a pulse having a duration of ten nanoseconds or less, focusing the radiation to obtain a power density at the workpiece of at least 10⁹ watts per square centimeter, interacting the radiation with the workpiece to produce a material vapor which reacts with the environmental gas to form a vapor oxide, and continuing to interact the radiation with the workpiece at a pulse repetition rate of at least 10 pulses per second and preferably at least 50 pulses per second until a desired amount of material is removed.

Referring now to FIGS. 2 and 3. In operation, the workpiece 14, with the sacrificial element 20 located against the back surface 18 within an environmental gas capable of oxidizing vaporized workpiece material, is located in proximity to the laser. Laser radiation in the TEM$_{00}$ mode is emitted from the laser as a pulse having a duration of 10 nanoseconds or less, and is focused on the workpiece to a power density of at least 10⁹ watts per square centimeter by the focusing optics. The high intensity, short duration pulse, interacts with the workpiece at a pulse repetition rate of at least ten and preferably 50 or more pulses per second to remove workpiece material by vaporization. Since the thermal response time of the material is greater than the duration of the pulse almost all the absorbed energy is utilized to vaporize material with little or no energy conducted into the base material resulting in little or no heat affected zone in the material adjacent the hole.

The vaporized workpiece material is ejected from the workpiece and reacts with the oxidizing environmental gas to form a vapor oxide which does not deposit on the walls of the hole. This results in the formation of a hole without a recast layer. However, when material is vaporized in a nonoxidizing atmosphere, the resulting hole is characterized by a recast layer of considerable extent. The lack of an oxidizing environment results in the vapor condensing and solidifying on the walls of the hole to form the recast layers. An additional benefit of locating the workpiece in an oxidizing environment is that the vapor oxide does not adhere to the surface of the focusing optics resulting in a considerable reduction of the replacement rate of the optics.

The amount of material removed per pulse is dependent upon the pulse energy, pulse duration and pulse power density incident on the target. In the method of the present invention, pulses are focused to a diameter typically variable between 0.04 to 0.01 centimeters resulting in a focused power density on the workpiece between $8 \times 10^9$ to $10 \times 10^{10}$ watts per square centimeter. Pulses having these characteristics typically vaporize less then $10^{-5}$ cubic centimeters of workpiece material per pulse and high pulse repetition rates are required to form a hole. The holes produced typically have diameters less than 0.127 centimeters.

Figure 4:
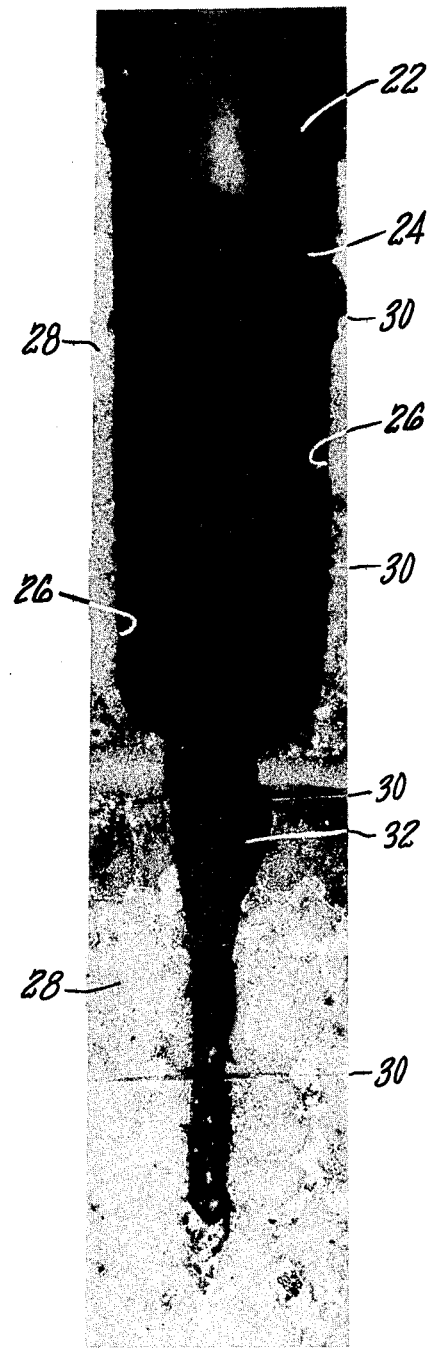
FIG. 4 shows a photomicrograph of a typical hole produced using the method of the present invention in Mar-M200 + HF material.

FIG. 4 shows a composite 200× photomicrograph of a hole 22 formed with pulses of laser radiation in accordance with the method of the present invention. The hold has an entrance 24 relatively perpendicular to the surface of the material and has sides 26 which are relatively straight resulting in the diameter being relatively constant throughout the length of the hole. The 200× magnification represented by this composite photomicrograph shows no indication of a recast layer. Examination of the base material 28 surrounding the hole indicates that the heat affected zone in the vicinity of the hole is nonexistent or at most a minimum. Lines 30 are due to the technique used to obtain the composite photomicrograph and are not representative of the quality of the hole.

Figure 5:
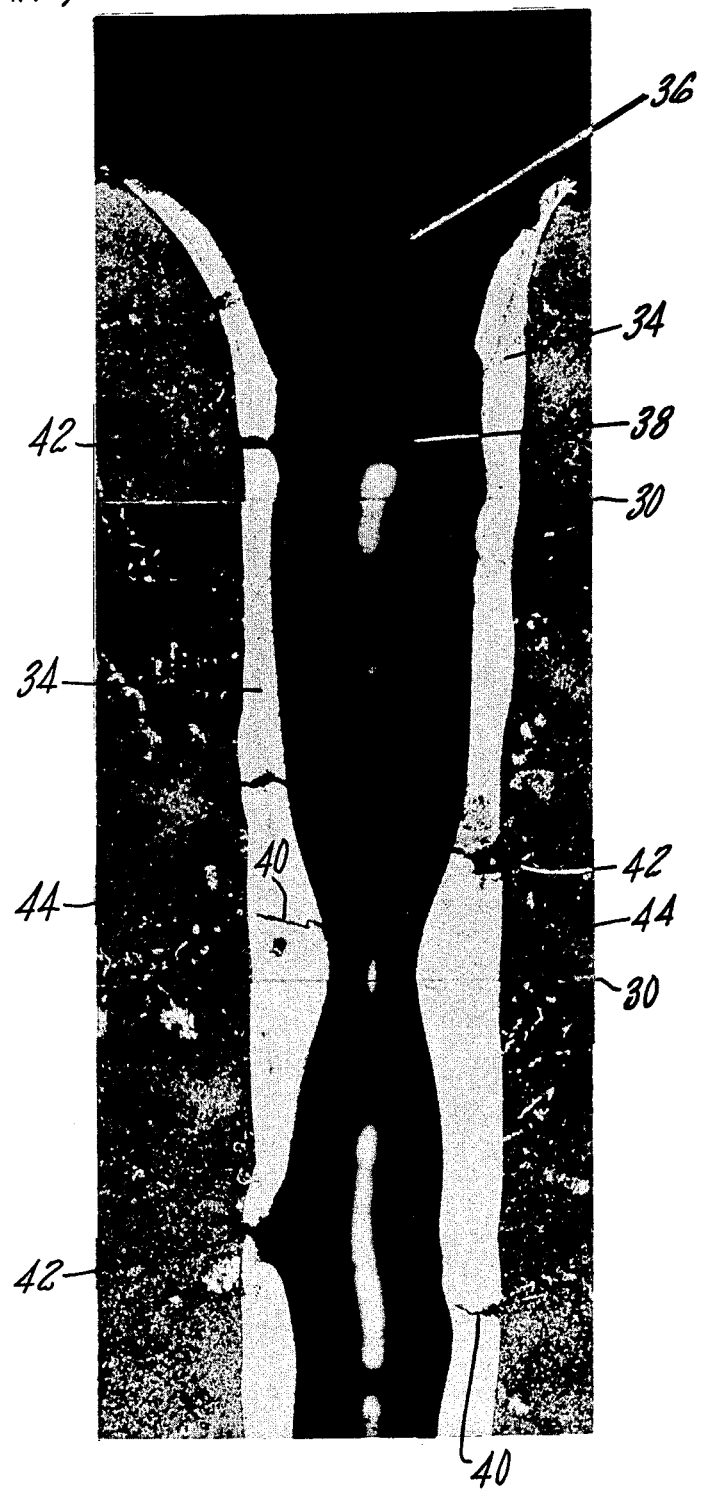
FIG. 5 shows a photomicrograph of a typical hole produced by the prior art method in Mar-M200 + HF material.

FIG. 5 shows a composite 200× photomicrograph of a hole 34 in Mar-M200 + HF material produced by a method of the prior art. The entrance 36 of the hole has a funnel shape and a recast layer 38 of considerable extent exists along the sides of the hole. Shrinkage cracks 40 are located throughout the recast layer with some cracks 42 penetrating into the base material 44. Lines 30 as previously noted are due to the formation of the composite photograph.

Referring again to FIG. 4. The initial hole formed in the workpiece has the general shape of the neck 32. As the interaction is maintained, the neck portion proceeds deeper into the material with the larger diameter hole 24 being generated behind the neck. The hole forms a cavity in which the radiation is essentially entirely absorbed in the walls of the hole to produce vaporization and the resultant material removal. However, when the depth of the hole 24 increases to the point where the neck 32 penetrates through the back surface of the workpiece to form a hole exit, the laser radiation undergoes multiple reflections from the sides of the hole and passes out of the workpiece through the hole exit without being absorbed in the workpiece. A sacrificial element 20 as shown in FIG. 1 is positioned in contact with the back surface 18 of the workpiece such that in operation, the neck 32 proceeds through the workpiece into the sacrificial element to a depth sufficient to allow the hole 24 to have a uniform cross section as shown in FIG. 4 through the workpiece. The sacrificial element maintains the cavity to allow the energy of the pulses to continue to be absorbed in the workpiece.

The preferred embodiment of the present invention is a method of vaporizing material in an oxidizing environment to produce a hole free of recast layer and heat affected zone. However, vaporization is a less efficient method of material removal than the heretofore method of using laser radiation having long pulses to produce holes typically having recast layers and heat affected zones, which, for many applications, must be removed before the workpiece can be utilized. In an embodiment of the present invention as shown diagrammatically in FIG. 6, laser radiation having pulses of long duration are utilized to remove material from a workpiece to efficiently form a hole having a recast layer and heat affected zone and the method of the present invention is utilized to remove the recast layer and heat affected zone by vaporization in an oxidizing environment. This process maximizes the utilization of the desirable aspects of both methods. The steps of the embodiment include locating a workpiece in proximity to a source of laser radiation, providing laser radiation in the $TEM_{OO}$ mode as a pulse having a duration of at least two hundred microseconds, focusing the radiation to obtain a power density sufficient to melt subsurface material, typically at least $10^6$ watts per square centimeter, interacting the focused radiation with the workpiece to remove material, continuing to interact the pulse with the workpiece at a pulse repetition rate typically less than ten pulses per second until a desired amount of material is removed to form a hole having a recast layer and heat affected zone, providing an environmental gas around the workpiece capable of oxidizing vaporized workpiece material, locating a sacrificial element in contact with the back surface of the workpiece, providing laser radiation in the $TEM_{OO}$ mode as a short pulse having a duration of ten nanoseconds or less, focusing the radiation to obtain a power density incident on the workpiece of at least $10^9$ watts per square centimeter, interacting the radiation with the workpiece to produce a material vapor which reacts with the environment gas to form a vapor oxide, and continuing to interact the radiation with the workpiece at a repetition rate of at least ten pulses per second until a desired amount of recast layer and heat affected material is removed.

It is to be recognized that the method of the present invention may be utilized to remove material adjacent holes formed by many techniques or to reshape holes formed by many methods.

Although this invention has been shown and described with respect to a preferred embodiment thereof it should be understood by those skilled in the art that various changes and omissions in the method may be made therein without departing from the spirit and scope of the invention.

Having thus described a typical embodiment of our invention, that which we claim as new and desired to secure by Letters Patent of the United States is:

1. The method for obtaining a hole essentially free of a recast layer and heat affected zone in a workpiece with laser radiation including in combination the steps of:

locating the workpiece in an environmental gas capable of oxidizing vaporized workpiece material to form an oxide of the vapor which does not adhere to the workpiece material;

providing laser radiation as a pulse having a duration comparable to the time required to vaporize workpiece material;

focusing the radiation to obtain a power density capable of vaporizing the workpiece material; and interacting the radiation with the workpiece to vaporize workpiece material and allow the gas to oxidize the vapor.

2. The method as recited in claim 1 wherein the radiation interacts with the workpiece as a series of pulses at a high rate of repetition until a desired amount of material is removed.

3. The method as recited in claim 2 wherein the pulse repetition rate is at least 10 pulses per second.

4. The method as recited in claim 2 wherein each pulse of laser radiation has a duration no greater than 10 nanoseconds.

5. The method as in claim 2 wherein the radiation vaporizes less than $10^{-5}$ cubic centimeters of workpiece material per pulse.

6. The method as recited in claim 1 wherein the hole is formed having a diameter less than 0.127 centimeters.

7. The method as recited in claim 1 wherein the radiation is focused to obtain a power density at the workpiece of at least $10^9$ watts per square centimeter.

8. The method as recited in claim 1 wherein the transverse electromagnetic mode of the laser radiation is the lowest order.

9. The method as recited in claim 2 including the additional step of locating a sacrificial element in contact with a back surface of the workpiece capable of covering an exit of the hole in the back surface to maintain a cavity for the absorption of radiation whereby workpiece material is vaporized to obtain a hole through the workpiece having a desired shape.

10. The method for obtaining a hole in a workpiece with a sequence of pulses of laser radiation including in combination the steps of:
  locating the workpiece in an environmental gas capable of oxidizing the vaporized workpiece material to form an oxide of the vapor which does not adhere to the workpiece;
  providing laser radiation as a pulse having a duration of ten nanoseconds or less;
  focusing the radiation to obtain a power density at the workpiece of at least $10^9$ watts per square centimeter;
  interacting the radiation with the workpiece to vaporize workpiece material and allow the gas to oxidize the vapor whereby a hole is formed in the workpiece essentially free of recast layer and heat affected zone; and
  continuing to interact the radiation with the workpiece at a pulse repetition rate of at least ten pulses per second until a desired amount of material is removed.

11. The method as recited in claim 10 wherein the transverse electromagnetic mode of laser radiation is the lowest order.

12. The method as recited in claim 11 wherein the radiation interacts with the workpiece at a pulse repetition rate of at least 40 pulses per second until a desired amount of material is removed.

13. The method for obtaining a hole in a workpiece with laser radiation including in combination the steps of:
  creating in a workpiece a hole typically having a zone of substandard quality;
  locating the workpiece in an environmental gas capable of oxidizing vaporized workpiece material to form an oxide of the vapor which does not adhere to the workpiece material;
  providing laser radiation as a pulse having a duration comparable to the time required to vaporize workpiece material;
  focusing the radiation to obtain a power density at the workpiece capable of vaporizing workpiece material;
  interacting the focused radiation with the workpiece to vaporize workpiece material and allow the gas to oxidize the vapor; and
  continuing to interact the radiation with the workpiece with pulses having a high repetition rate until a desired amount of substandard material is removed.

14. The method as recited in claim 13 wherein the steps of creating in a workpiece a hole of substandard quality includes the steps of:
  locating the workpiece in proximity to a source of laser radiation;
  providing laser radiation as a pulse having a duration long compared to the time required to vaporize workpiece material;
  focusing the pulse to obtain a power density at the workpiece capable of melting workpiece material; and
  interacting the radiation with the workpiece at a rate of less than ten pulses per second until a desired amount of material is removed to form a hole having substandard quality.

15. The method as recited in claim 13 including the additional step of positioning a sacrificial element in contact with the back surface of the workpiece.

16. The method for obtaining a hole essentially free of recast layer and heat affected zone in a workpiece with a sequence of pulses of laser radiation including in combination the steps of:
  creating in a workpiece a hole having substandard quality;
  locating the workpiece in an environmental gas capable of oxidizing vaporized workpiece material;
  providing laser radiation as a pulse having a duration of ten nanoseconds or less;
  focusing the radiation to obtain a power density on the workpiece of at least $10^9$ watts per square centimeter;
  interacting the focused radiation with the workpiece to vaporize workpiece material and allow the gas to oxidize the vapor; and
  continuing to interact the radiation with the workpiece at a pulse repetition rate of at least 40 pulses per second until a desired amount of substandard material is removed.

* * * * *